United States Patent

[11] 3,590,549

| [72] | Inventor | Seymour Zelnick<br>Orange, N.J. |
|---|---|---|
| [21] | Appl. No. | 735,366 |
| [22] | Filed | June 7, 1968 |
| [45] | Patented | July 6, 1971 |
| [73] | Assignee | Weldotron Corporation<br>Newark, N.J. |

[54] METHOD AND APPARATUS FOR WRAPPING A PALLET LOAD
10 Claims, 5 Drawing Figs.

[52] U.S. Cl. ................................................ 53/30,
53/33, 53/182
[51] Int. Cl. ................................................ B65b 53/02
B65b 61/10
[50] Field of Search .......................................... 53/28, 32,
33, 182, 189, 30; 206/65 C, 65 E

[56] References Cited
UNITED STATES PATENTS
| 2,864,212 | 12/1958 | Bruce............................ | 53/184 X |
| 3,050,402 | 8/1962 | Dreyfus et al................. | 53/30 UX |

*Primary Examiner*—Theron E. Condon
*Assistant Examiner*—E. F. Desmond
*Attorney*—Harry Cohen ABSTRACT: A pallet load of product is secured onto a pallet by forming a sleeve of heat shrinkable film around the pallet load with its open top extending above the pallet load and its open bottom extending below the platform of the pallet. An auxiliary web of relatively high shrink energy film is secured to the sleeve diametrically above the load, and an additional auxiliary web of relatively high shrink energy film is secured to the sleeve diametrically below the platform.

PATENTED JUL 6 1971 3,590,549

INVENTOR.
SEYMOUR ZELNICK
BY Harry Cohn
ATTORNEY 3,590,549

METHOD AND APPARATUS FOR WRAPPING A PALLET LOAD

BACKGROUND OF THE INVENTION

1. Field of The Invention

This invention relates to a method and an apparatus for forming a tight sleeve of film about an article.

2. Description of The Prior Art

The packaging of articles in thermoplastic film is well known. Advantageously, the film is heat shrinkable, is initially sealed around the article, and is subsequently heated to shrink the film tightly about the article. This initial sealed wrap may be accomplished manually, as for example, shown in U.S. Pat. No. 3,047,991, issued to M. Siegel et al. on Aug. 7, 1962; or automatically, as for example, shown in U.S. Pat. No. 3,222,800, issued to M. Siegel et al. on Dec. 14, 1965. In U.S. Pat. application Ser. No. 706,601, by S. Zelnick, filed on Feb. 19, 1968, there is shown a method and an apparatus for shrink-film wrapping a pallet load. A load of product on a pallet is wrapped in a vertical sleeve of heat shrinkable thermoplastic film which is subsequently shrunk so that the entire pallet load is unitized, stabilized and protected against detrimental environmental conditions. The length of the vertical sleeve of film which is initially formed about the pallet load before the subsequent shrinking of the film is customarily considerably longer than the vertical height of the pallet load so as to allow sufficient film, on shrinking, for overlapping the peripheral margins of the top surface of the pallet load.

However, since the film is rather limp and not self-supporting, that portion of the sleeve which initially, prior to shrinking, extends above the pallet load, can collapse or sag, prior to shrinking, around the pallet load, below the top surface thereof. Where the film has so sagged, it will not overlap the peripheral margins of the top surface of the pallet load subsequent to shrinking. In a sleeve forming apparatus, such as is shown in U.S. Ser. No. 706,601, supra, wherein the sleeve is formed of two webs of film, welded together along two vertical seams, one along the leading face of the pallet load, the other along the trailing face, the sag is particularly noticable along the leading and trailing faces of the load. This is due, at least in part, to the sleeve being looser along the leading and trailing faces, than along the lateral faces. This is due to the jaw assemblies, which form the weld having a finite spacing between the film clamping bars which are immediately adjacent to the surface of the load, and the welding jaws which are slightly remote from that surface. This spacing precludes the sleeve as welded and unclamped from being as tight as when clamped before and during welding.

SUMMARY OF THE INVENTION

Accordingly, it is an object of this invention to provide a system for supporting the portion of the sleeve extending above the top surface of the pallet load before and during the shrinking of the sleeve.

A feature of this invention includes feeding an auxiliary narrow web of film diametrically across the top surface of the pallet load and joining this additional web to the leading and trailing faces of the primary sleeve. This joining is performed contemporaneously with the joining of the two main films to form the primary sleeve.

BRIEF DESCRIPTION OF THE DRAWING

These and other objects, features and advantages of the invention will be apparent from the following specification thereof, taken in conjunction with the accompanying drawing in which.

DESCRIPTION OF THE INVENTION

Figure 1:
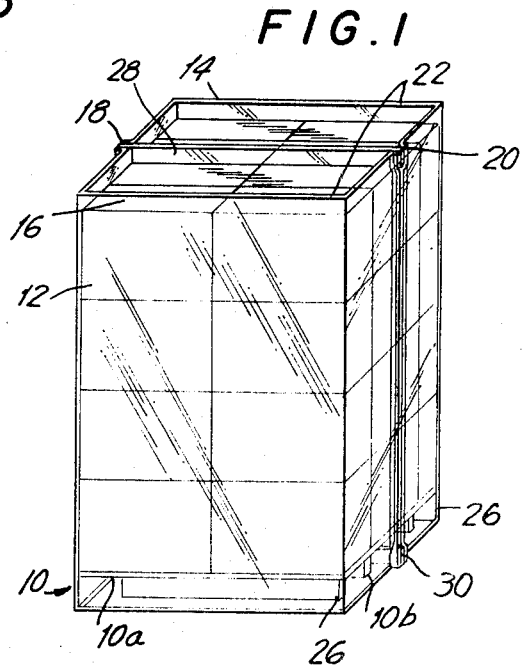
FIG. 1 is a perspective view in lateral elevation of a pallet load which has been sleeve wrapped according to the principles of this invention, before the sleeve has been shrunk.

As shown in FIG. 1, a pallet 10 bearing a load of products, such as stacked boxes 12, is wrapped in a vertical sleeve provided by a first web of film 14 and a second web of film 16 joined together in a vertical weld 18 on the leading face of the load and joined together in a vertical weld 20 on the trailing face of the load. A portion 22 of this vertical sleeve extends up above the top surface 24 of the load. If desired, and here shown, a portion 26 of the vertical sleeve may extend down below the platform 10a of the pallet. An auxiliary narrow web of film 28 is disposed diametrically across the top surface of pallet load and has its two ends respectively welded into the two welds 18 and 20. If desired, and here shown, a second auxiliary narrow web of film 30 may be disposed diametrically under the surface of the platform 10a, between the cleats 10b of the pallet 10, with its two ends respectively welded into the two welds 18 and 20.

The material used for the additional web 28 (and 30) must be compatible with the film 16 and 18 used to form the sleeve for the purpose of welding or sealing thereto, but, desirably, should also possess higher shrink energy. Thus, for example, where low density shrink polyethlene is used for the webs 16 and 18, an excellent material to use for the auxiliary webs 28 (and 30) is a medium density shrink polyethylene film (such as "D" film). The action of this auxiliary web 28 is twofold:

1. Since it rests directly on the top surface of the pallet load, and is attached to and between the leading and trailing portions of the upper portion of the sleeve, it opposes any tendency of these leading and trailing subportions to sag away from the load.

2. As the auxiliary web shrinks, because of its relatively high shrink energy, it positively pulls the leading and trailing subportions of the upper portion of the sleeve over and onto the top surface of the pallet load. (Similarly, the additional web 30 will pull the low portion of the sleeve under the platform.)

Figure 3:
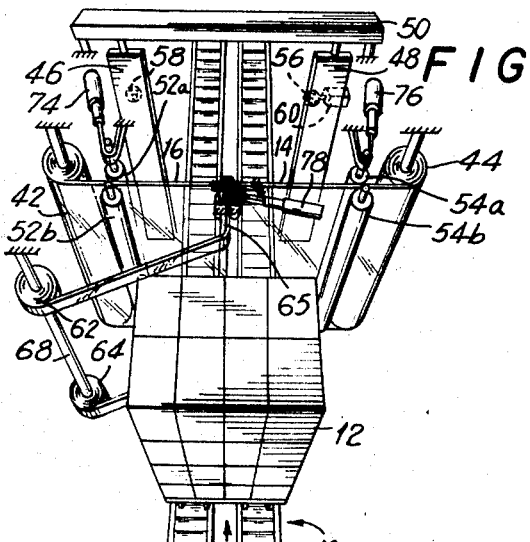
FIG. 3 is a perspective view in top plan of an apparatus for forming the sleeve of FIG. 1 showing the two main films and the auxiliary film welded together in the leading weld.
Figure 4:
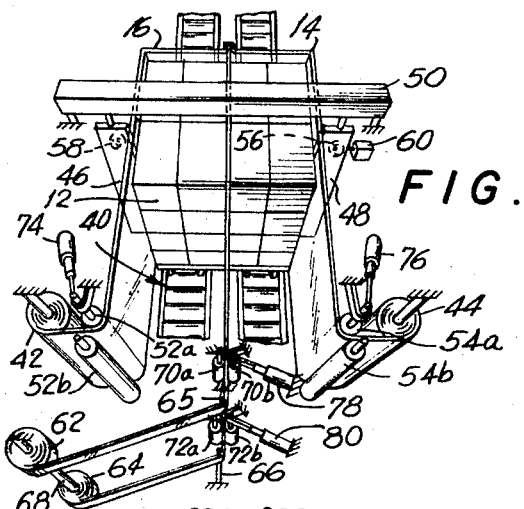
FIG. 4 is a perspective view in top plan of the apparatus of FIG. 3 showing an intermediate stage in the formation of the sleeve.
Figure 5:
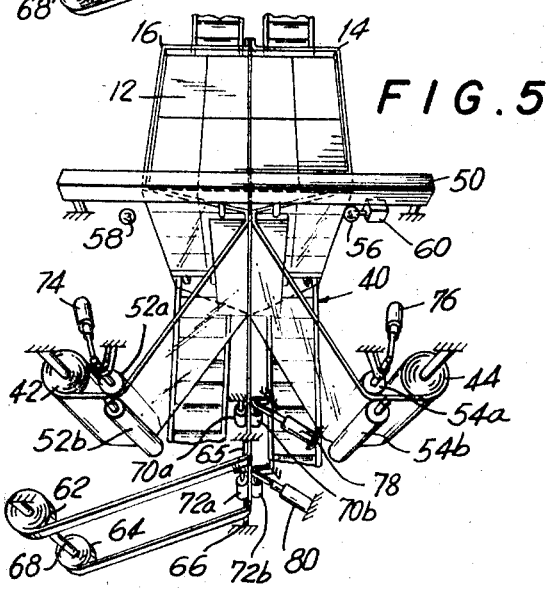
FIG. 5 is a perspective view in top plan of the apparatus of FIG. 3 showing the two main films and the auxiliary film welded together in the trailing weld.
Figure 2:
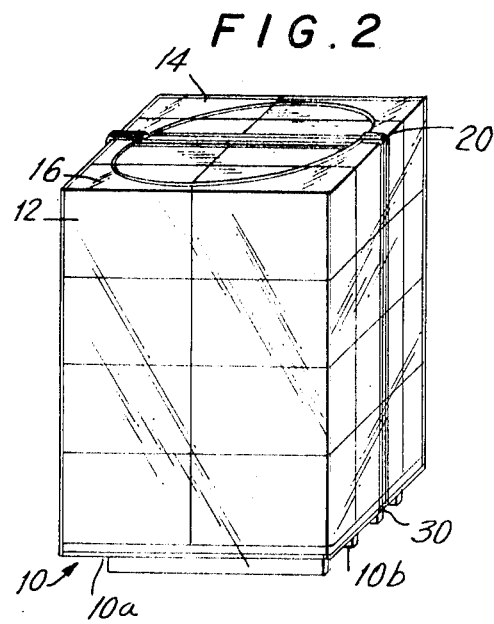
FIG. 2 is a perspective view in lateral elevation of the sleeve wrapped pallet load of FIG. 1, after the sleeve has been shrunk.

As shown in FIG. 3, the pallet 10 bearing a load of stacked boxes 12, is carried by an open midline infeed conveyor 40 in the direction of the arrow A. A curtain of film 14/16, which has at least some resiliency, extends across the conveyor and unwinds from two vertically journaled supply rolls 42, 44. A pair of clamping-sealing jaw assemblies 46, 48 extends vertically and is supported between an overhead, horizontal guide member 50 and a lower horizontal guide member, not shown, and is laterally movable by suitable means, such as chains or air cylinders, not shown. The loaded pallet is advanced, as shown in FIG. 2, against the curtain of film, and carries the curtain along, unwinding film from the two supply rolls and between two pairs of pinch rolls, 52a, 52b, and 54a, 54b. The loaded pallet continues to advance until the trailing edge of the pallet has advanced a sufficient distance beyond the jaw assemblies, so as to clear these assemblies. This position, as shown in FIG. 3, is detected by a photocell 56, energized by a light source 58. The photocell actuates a relay circuit 60 to halt the conveyor and to start the jaw assemblies moving towards each other, to close behind the loaded pallet onto the bight of the to seal and sever the two superposed webs of film, thus forming a vertical tube or sleeve of film about the loaded pallet, and at the same time, forming a new curtain of film between the supply rolls for the next successive loaded pallet.

Details of exemplary structure of the jaw assemblies are disclosed in U.S. Ser. No. 706,601, supra.

The auxiliary web 28 is unwound from a supply roll 62 over the level of the top of the pallet load, around a guide hook 65 and along the midline of the conveyor. When the jaw assembly closes on the webs 14 and 16, it catches the web 28 therebetween and welds the three webs together. The auxiliary web 30 is unwound from a supply roll 64 under the conveyor around a guide hook 66 and along the midline of the conveyor under the level of the platform 10a of the pallet. When the jaw assembly closes on the webs 14 and 16, it catches the web 30 therebetween and welds the three webs together.

The supply rolls may be mounted on a common shaft 68. The tension on each of the webs may be controlled by a respective pair of pinch rolls, 52a, 52b; 20a, 20b; and 22a, 22b, roll of each pair being braked by an air cylinder operated brake band 74, 76, 78 and 80.

While there has been shown and described the preferred embodiments of the invention, it will be understood that the invention may be embodied otherwise than as herein specifically illustrated and described, and that certain changes in the forms and arrangement of parts and in the specific manner of practicing the invention may be made without departing from the underlying idea or principle of this invention within the scope of the appended claims.

I claim:

1. A method of stabilizing a pallet load, comprising:
   encircling the pallet load with a primary sleeve of heat shrinkable film having a vertical longitudinal axis and having a portion thereof extending above the top surface of the pallet load;
   disposing an auxiliary elongated web of heat shrinkable film on the top surface of the pallet load and joining the ends thereof to spaced apart, opposed subportions of said portion of the sleeve extending above the top section of the pallet load; and
   shrinking said web and said sleeve about said pallet load.

2. A method according to claim 1, wherein:
   the film which is used for the auxiliary web has a higher shrink energy than the film which is used for the primary sleeve.

3. A method according to claim 1 wherein:
   said primary sleeve has a portion thereof extending below the platform of the pallet; and further including;
   disposing an additional auxiliary elongated web of heat shrinkable film under the platform of the pallet and joining the ends thereof to spaced apart, opposed subportions of said portion of the sleeve extending below the platform of the pallet.

4. A method according to claim 3 wherein:
   the film which is used for the auxiliary webs has a higher shrink energy than the film which is used for the primary sleeve.

5. A method of providing a sleeve of plastic film tightly around an article including at least the peripheral margins of the top surface thereof, comprising:
   providing a path for the article;
   joining together in a vertical junction the running ends of two webs of film from respective supplies thereof respectively disposed on opposite sides of said path to provide a curtain of film across said path, and at the same time joining into said junction the running end of an auxiliary web of film disposed above the top surface of the article;
   advancing said article against said curtain of film to carry said curtain along said path, withdrawing additional film from said supplies, and forming a bight in said curtain around said article; and
   joining together in a vertical junction two spaced apart portions of said bight of film closely behind said article to form a sleeve of film about said article, severing said sleeve from remainder of said webs to form a fresh curtain of film across said path, and at the same time joining into said junction an intermediate portion of said auxiliary web joined into said vertical junction of said fresh curtain of film.

6. A method according to claim 5 further including heat shrinking said sleeve and said auxiliary web about said article.

7. A method, according to claim 6 wherein:
   the film which is used for the auxiliary web has a higher shrink energy than the film which is used for the primary sleeve.

8. A method according to claim 5 wherein
   at the same time that said ends of said auxiliary web of film above said top surface of said article are respectively joined to said portions, the ends of similar additional web of film below the said article are respectively joined to said junctions.

9. Apparatus for providing a sleeve of plastic film tightly around and article including at least the peripheral margins of the top surface thereof, comprising: means for conveying the article along a path; first and second film supply means respectively disposed on each side of the path for respectively supplying first and second webs of film; sealing-cutting means for joining the respective running ends of said first and second webs together in a junction perpendicular to said path for forming said webs into a curtain perpendicularly across said path, extending above the top surface of the article; and means for forming a sleeve of film from said curtain around said article; third film supply means for supplying a third web of film above the article; said sealing-cutting means being adapted to join said third web into said junction concurrently with joining said first and second web into said junction.

10. Apparatus according to claim 9 further including:
   fourth film supply means for supplying a fourth web of film below the article.
   said sealing-cutting means being adapted to join said fourth web into said junction concurrently with joining said first, second and third webs into said junction.